United States Patent [19]
Gilbert et al.

[11] Patent Number: 5,436,769
[45] Date of Patent: Jul. 25, 1995

[54] REAR VIEW MIRROR ASSEMBLY FOR MOTOR VEHICLE

[75] Inventors: Robert W. Gilbert, Willunga; Garry G. L. Fimeri, Morphett Vale, both of Australia

[73] Assignee: Britax Rainsfords Pty. Limited, Australia

[21] Appl. No.: 993,309

[22] Filed: Dec. 18, 1992

[30] Foreign Application Priority Data

Dec. 21, 1991 [GB] United Kingdom ............... 9127174

[51] Int. Cl.⁶ ..................... G02B 7/18; B60R 1/06
[52] U.S. Cl. .................... 359/874; 359/876; 359/877; 248/478; 248/480; 248/481; 74/89.15; 74/424.8 R
[58] Field of Search ............. 359/872, 873, 874, 876, 359/877; 74/89.14, 89.15, 424.8 R, 425; 248/477, 478, 479, 480, 481, 482, 483

[56] References Cited

U.S. PATENT DOCUMENTS

| | | |
|---|---|---|
| Re. 34,142 | 12/1992 | Fimeri . |
| 4,256,333 | 3/1981 | Jones . |
| 4,324,454 | 4/1982 | Kumai .................... 359/877 |
| 4,362,362 | 12/1982 | Usami et al. ............. 359/877 |
| 4,494,420 | 1/1985 | Sakuma .................. 359/874 |
| 4,498,738 | 2/1985 | Kumai .................... 359/877 |
| 4,611,501 | 9/1986 | Brown .................... 359/877 |
| 4,632,525 | 12/1986 | Hayashi et al. .......... 359/877 |
| 4,693,571 | 9/1987 | Kimura et al. ........... 359/877 |
| 4,815,837 | 3/1989 | Kikuchi et al. .......... 359/877 |
| 4,856,885 | 8/1989 | Fimeri ................... 359/874 |
| 4,877,214 | 10/1989 | Toshiaki et al. ......... 359/877 |
| 4,940,321 | 7/1990 | Yoshida ................. 359/877 |

FOREIGN PATENT DOCUMENTS

| | | |
|---|---|---|
| 0272047 | 6/1988 | European Pat. Off. . |
| 1175789 | 4/1959 | France . |
| 56-3315 | 1/1981 | Japan . |
| 2032367 | 5/1980 | United Kingdom . |

*Primary Examiner*—Ricky D. Shafer
*Attorney, Agent, or Firm*—Harness, Dickey & Pierce

[57] ABSTRACT

A drive unit for adjusting the orientation of a reflective member of rear view mirror assembly for a motor vehicle is assembled within a drive housing. The drive housing contains an electric motor arranged to drive a jacking nut which is supported within the housing by first and second bearing surfaces formed on opposite walls of the housing. The drive housing is formed in two parts, each of which comprises a base portion and a peripheral side wall portion dimensioned so that, when the two parts are assembled together, part of the side wall portion of one part surrounds a corresponding part of the side wall portion of the other part. After assembly, glue is inserted between the side wall portions so as to hold the two parts together with their respective bearing surfaces spaced apart by a distance determined by the size of the jacking nut.

5 Claims, 2 Drawing Sheets

REAR VIEW MIRROR ASSEMBLY FOR MOTOR VEHICLE

FIELD

This invention relates to a rear view mirror assembly for a motor vehicle of the type in which a reflective member is mounted on a pivot mounting for angular movement within a mirror case and a drive housing is located within the mirror case and has a projecting jacking screw which is pivotally coupled to the rear surface of the reflective member at a location remote from said pivot mounting.

RELATED ART

Patent Specification No. EP-A-0272047 discloses a rear view mirror assembly of this type in which the drive housing containing an electric motor arranged to drive a jacking nut for effecting variation in the extent of protrusion of the jacking screw from the housing so as to adjust the orientation of the reflective member relative to the mirror case, the jacking nut being supported within the housing by a bearing surface formed on one wall of the housing and a bearing spring which engages with the opposite wall of the housing. The bearing spring serves to take up manufacturing tolerances affecting the size of the jacking nut and the distance between the two opposite walls of the housing. It is an object of the present invention to provide a rear view mirror assembly of this type in which the provision of a bearing spring is not necessary.

Patent Specification No. GB-A-2032367 discloses a rear view mirror assembly in which the drive housing is formed in two parts, each of which comprises a base portion and a peripheral side wall portion, dimensioned so that, when the two parts are assembled together, part of the side wall portion of one part surrounds a corresponding part of the side wall portion of the other part and an edge of one of the side wall portions engages with a protrusion on the other side wall portion which limits the extent of overlap of the two side wall portions and thereby determines the distance between the base portions.

SUMMARY OF THE INVENTION

According to the invention in one aspect, a rear view mirror assembly for a motor vehicle comprises a reflective member mounted on a pivot mounting for angular movement within a mirror case and a drive housing located within the mirror case and formed in two parts, each of which comprises a base portion having a bearing surface formed on its inner surface and a peripheral side wall portion dimensioned so that part of the side wall portion of one part surrounds a corresponding part of the side wall portion of the other part when the two parts are assembled together, a jacking nut positioned between the bearing surfaces, glue inserted between the side wall portion of one part and the side wall portion of the other part so as to secure the two parts together with their respective bearing surfaces spaced apart by a distance determined by the size of the jacking nut, a jacking screw engaging in the jacking nut and having an end pivotally coupled to the rear surface of the reflective member at a location remote from said pivot mounting, and an electric motor located within the drive housing and arranged to drive the jacking nut for effecting variation in the extent of protrusion of the jacking screw from the drive housing so as to adjust the orientation of the reflective member relative to the mirror case.

Another aspect of the invention provides a method of assembling a drive unit for a rearview mirror assembly for a motor vehicle comprising a reflective member mounted on a pivot mounting for angular movement within a mirror case, the method comprising: forming two parts of a drive housing, each part comprising a base portion and a peripheral side wall portion with a respective bearing surface on its base portion, the side wall portions being dimensioned so that, when the two parts are assembled together, part of the side wall portion of one part surrounds a corresponding part of the side wall portion of the other part; assembling an electric motor, a jacking nut and a jacking screw within the housing so that the jacking nut is supported within the housing by said bearing surfaces; and holding the two parts together with their respective bearing surfaces abutting the jacking nut while inserting glue between the side wall portions so as to secure the two parts together.

By arranging for a predetermined force to hold the two parts together while the glue is applied, it can be ensured that the jacking nut is a precise sliding fit between the bearing surfaces, any variation in size due to manufacturing tolerance being taken up by variation in the degree of overlap of the side wall portions of the two parts.

Preferably, the side wall portion of one of the parts of the drive housing is inclined relative to the side wall portion of the other part so as to provide a tapering gap to facilitate insertion of the glue.

DETAILED DESCRIPTION OF THE PREFERRED EMBODIMENT

Figure 1:
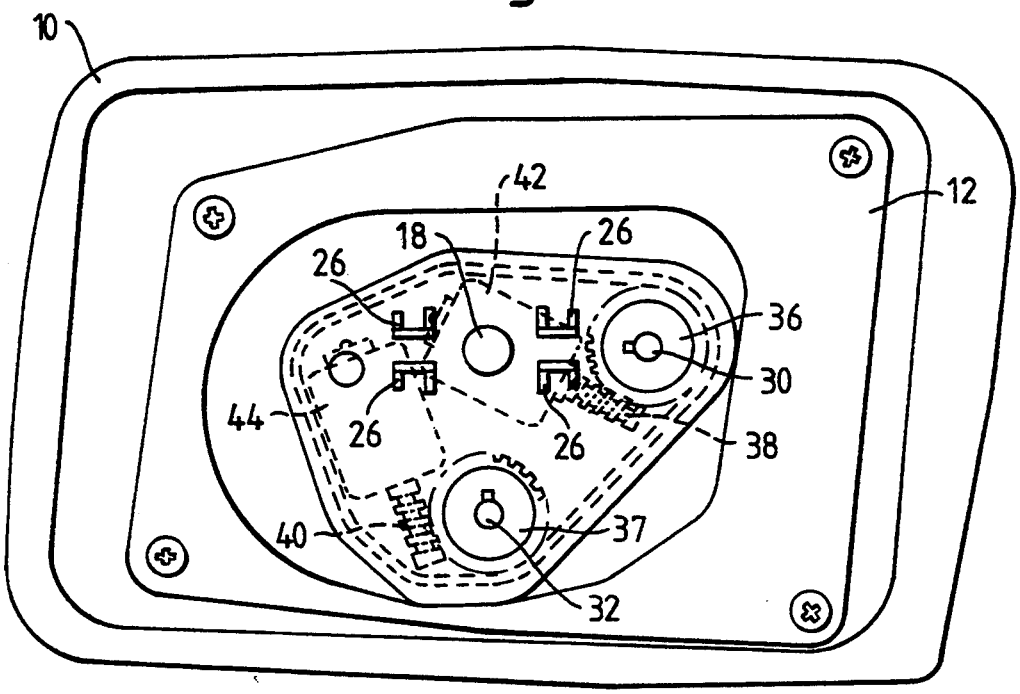
FIG. 1 is an elevation of a vehicle rear view mirror assembly in accordance with the invention, viewed in a rearward direction with respect to a motor vehicle on which it is mounted, with the reflective member removed.
Figure 2:
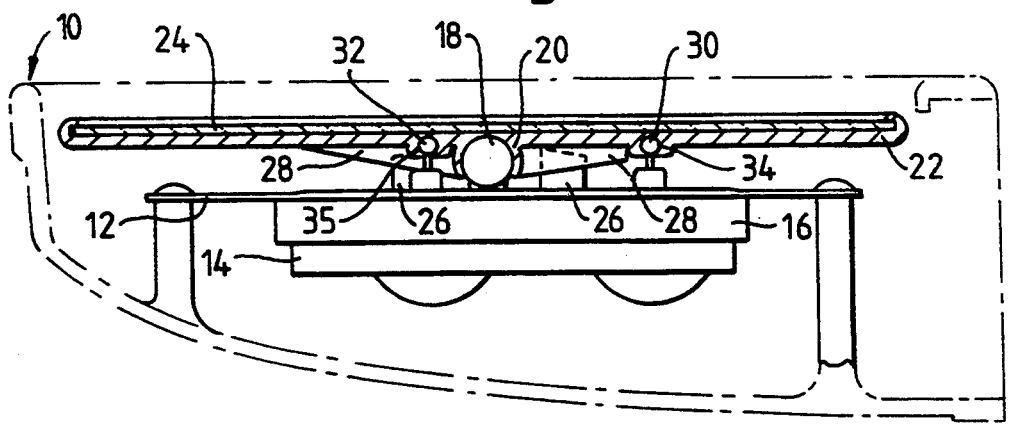
FIG. 2 is a schematic part-sectional plan view from below of the mirror shown in FIG. 1.

Referring to FIGS. 1 and 2, a rear view mirror assembly comprises a mirror case 10 containing a mounting plate 12 on which is mounted an adjustment mechanism housing which, in accordance with the invention, comprises an inner part 14 and an outer part 16. The outer part 16 is formed integrally with the mounting plate 12 and supports a ball element 18 which engages in a socket 20 formed in a mirror carrier 22 which has a reflective member 24 on its outer surface. Projections 26 on the outer surface of the housing part 16 engage with flanges 28 on the back of the mirror carrier 22 to prevent relative angular movement of the mirror carrier 22 and the housing 10 about an axis perpendicular to the plane of the mounting plate 12.

A pair of jacking screws 30 and 32 project from the outer housing part 16 and have ball formations on their outer ends which engage in respective sockets 34 and 35 in the back of the mirror carrier 22, for effecting angular movement of the mirror carrier 22 about two mutually orthogonal axes. As is shown in outline in FIG. 1, each jacking screw 30, 32 engages in a respective jacking nut, 36, 37, each of which has gear teeth on its periphery engaged by respective worms 38 and 40 on the output shafts of respective electric motors 42 and 44.

Figure 3:
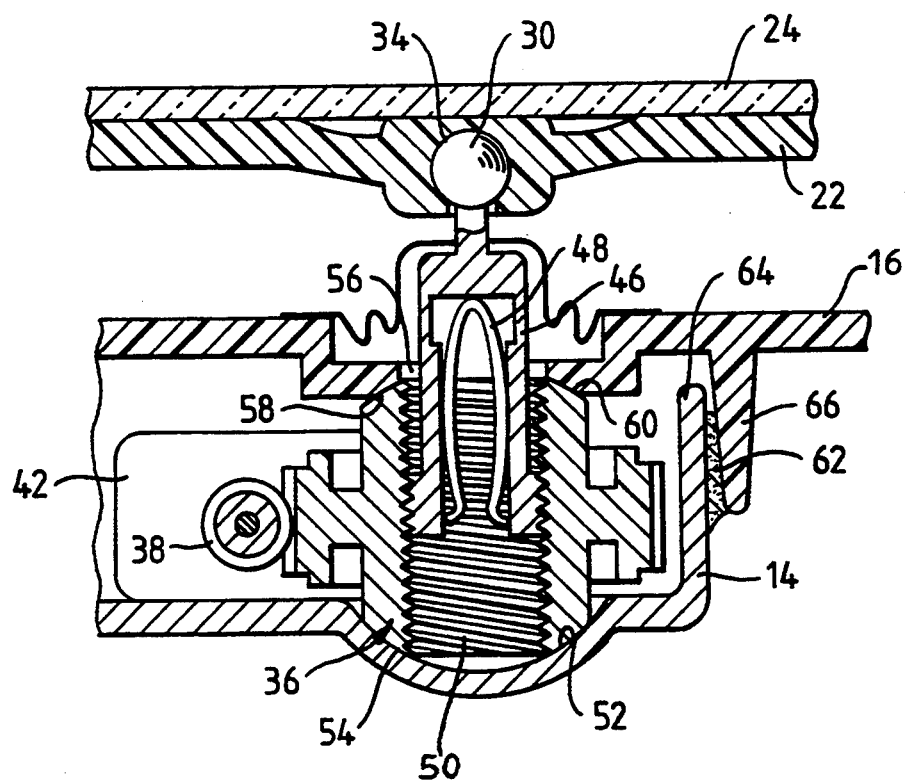
FIG. 3 is a cross-section through a screw jack unit of the mirror assembly shown in FIGS. 1 and 2.

As can be seen from FIG. 3, the jacking screw 30 has two limbs 46 which are splayed out by a U-shaped spring 48 and carry screw thread formations on the other surface of their ends which engage in an inner threaded surface 50 in the jacking nut 36. The lower drive housing part 14 contains a part-spherical concave bearing surface 52 for engagement with the a complimentary spherical surface 54 on one end of the jacking nut 36. The upper part 16 has a hole 56, through which the jacking screw 30 projects, surrounded by a part-spherical concave bearing surface 58 which engages with a part-spherical surface 60 on the jacking nut opposite to the bearing surface 54.

The two parts 14 and 16 of the drive housing are held together by glue 62 between their overlapping side walls 64 and 66. The side wall 66 of the upper part 16 is inclined outwardly so as to provide a tapering gap with the side wall 64 of the lower part 14 so as to facilitate insertion of the glue 62. As the glue 62 is applied, the two parts 14 and 16 of the drive housing are held together by sufficient force to ensure that the jacking nut 36 is a rattle-free sliding fit between the bearing surfaces 54 and 58. Too large a force would create excessive friction between the jacking nut 36 and the bearing surfaces 54 and 58.

We claim:

1. A rear view mirror assembly for a motor vehicle comprising:
   a mirror case containing a pivot mounting,
   a reflective member mounted on the pivot mounting for angular movement within the mirror case,
   a drive housing located within the mirror case and formed in two parts, each of which comprises a base portion having a bearing surface formed on its inner surface and a peripheral side wall portion dimensioned so that part of the side wall portion of one part surrounds a corresponding part of the side wall portion of the other part when the two parts are assembled together,
   a jacking nut positioned between the bearing surfaces,
   glue inserted between the side wall portion of one part and the side wall portion of the other part so as to secure the two parts together with their respective bearing surfaces spaced apart by a distance determined by the size of the jacking nut,
   a jacking screw engaging in the jacking nut and having an end pivotally coupled to the rear surface of the reflective member at a location remote from said pivot mounting, and
   an electric motor located within the drive housing and arranged to drive the jacking nut for effecting variation in the extent of protrusion of the jacking screw from the drive housing so as to adjust the orientation of the reflective member relative to the mirror case,
   the two parts of the housing being shaped so that, before insertion of said glue, movement of the respective bearing surfaces towards one another is limited only by the jacking nut.

2. A rear view mirror assembly according to claim 1, wherein the side wall portion of one of the parts of the drive housing is inclined relative to the side wall portion of the other part so as to provide a tapering gap to facilitate insertion of the glue.

3. A rearview mirror assembly according to claim 2, comprising a predetermined force to hold the two parts together while the glue is applied.

4. A rearview mirror assembly according to claim 1, comprising a predetermined force to hold the two parts together while the glue is applied.

5. A method of assembling a drive unit for a rearview mirror assembly for a motor vehicle comprising a reflective member mounted on a pivot mounting for angular movement within a mirror case, the method comprising:
   forming two parts of a drive housing, each part comprising a base portion and a peripheral side wall portion with a respective bearing surface on its base portion, the side wall portions being dimensioned so that, when the two parts are assembled together, part of the side wall portion of one part surrounds a corresponding part of the side wall portion of the other part,
   assembling an electric motor, a jacking nut and a jacking screw within the housing so that the jacking nut is supported within the housing by said bearing surfaces, and
   holding the two parts together with their respective bearing surfaces abutting the jacking nut while inserting glue between the side wall portions so as to secure the two parts together,
   the two parts of the housing being shaped so that, before gluing, movement of the respective bearing surfaces towards one another is limited only by the jacking nut.

* * * * *